United States Patent [19]
Yamamoto

[11] Patent Number: 6,046,837
[45] Date of Patent: Apr. 4, 2000

[54] OPTICAL MODULATOR

[75] Inventor: Ryoichi Yamamoto, Kanagawa-ken, Japan

[73] Assignee: Fuji Photo Film Co., Ltd., Kanagawa-Ken, Japan

[21] Appl. No.: 09/206,287

[22] Filed: Dec. 7, 1998

[30] Foreign Application Priority Data

Dec. 8, 1997 [JP] Japan ................................. 9-336884

[51] Int. Cl.$^7$ ...................................................... G02F 1/03
[52] U.S. Cl. ...................... 359/245; 359/288; 359/315; 359/320
[58] Field of Search ................... 359/245, 320, 359/315, 288, 316, 295, 252

[56] References Cited

U.S. PATENT DOCUMENTS

| | | | |
|---|---|---|---|
| 4,411,495 | 10/1983 | Beni et al. ............................. | 359/252 |
| 4,786,149 | 11/1988 | Hoenig et al. ......................... | 359/291 |
| 5,022,742 | 6/1991 | Hains .................................... | 359/245 |
| 5,071,232 | 12/1991 | Kato et al. ............................. | 359/315 |
| 5,093,747 | 3/1992 | Dorschner ............................. | 359/316 |
| 5,608,568 | 3/1997 | Blodgett et al. ....................... | 359/288 |
| 5,781,331 | 7/1998 | Carr et al. ............................. | 359/288 |
| 5,930,021 | 7/1999 | Matsubara et al. .................... | 359/245 |

FOREIGN PATENT DOCUMENTS

| | | | |
|---|---|---|---|
| 4-49065 | 2/1992 | Japan ............................. | B41J 2/445 |
| 4-161922 | 6/1992 | Japan ............................. | G02F 1/055 |
| 4-175721 | 6/1992 | Japan ............................. | G02F 1/055 |

*Primary Examiner*—Loha Ben
*Attorney, Agent, or Firm*—Sughrue, Mion, Zinn Macpeak & Seas, PLLC

[57] ABSTRACT

The recording of an image is performed on a heat-mode sensitive material by an optical modulator equipped with an optical modulation element consisting of an electro-optic crystal substrate. An optical modulation element 10 has an electro-optic crystal substrate 11 consisting of PLZT ceramic. The optical modulation element 10 is arranged on a base plate 18 consisting of aluminum (Al). The base plate 18 is arranged on cooling mechanism 20 that cools the electro-optic crystal substrate 11. Temperature detection mechanism 23 for detecting the temperature of the electro-optic crystal substrate 11 is provided in a portion of the base plate 18. Control mechanism is provided for controlling the cooling mechanism 20 so that the temperature of the electro-optic crystal substrate 11 becomes constant, based on temperature information from the temperature detection mechanism 23.

8 Claims, 3 Drawing Sheets

F I G . 1
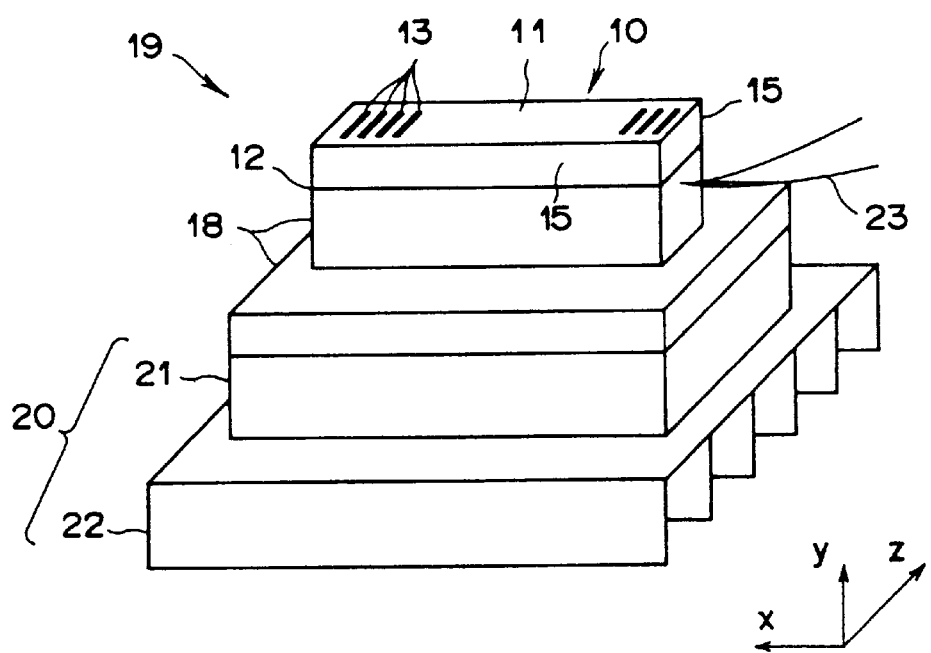

OPTICAL MODULATOR

BACKGROUND OF THE INVENTION

1. Field of the Invention

The present invention relates to an optical modulator equipped with an optical modulation element consisting of an electro-optic crystal, the optical modulator being employed in recorders such as laser printers, digital copying machines and the like and primarily being employed in recorders in the printing field which express gradation with mesh points onto a binary sensitive material, particularly a heat-mode sensitive material.

2. Description of the Related Art

Recorders, such as laser printers, digital copying machines and the like, which perform the recording of an image onto a heat-mode sensitive material with laser light or the like have hitherto been utilized.

When recording is performed on a heat-mode sensitive material with laser light, there is a need to employ laser light with considerably greater power. At the incident surface of an optical modulation element equipped inside of the recorder, the power density sometimes reaches as much as a few tens of $kW/cm^2$. If laser light is modulated with an optical modulation element consisting of an electro-optic crystal as the optical modulation element of the aforementioned recorder for recording an image on a heat-mode sensitive material, generally the electro-optic crystal will absorb light and the electro-optic element will generate heat, although there are a few exceptions. This generation of heat causes the electro-optic element to rise in temperature. Due to this temperature rise, if the element temperature exceeds a Curie point, the electro-optical effect will be considerably reduced and the electro-optic element will not be able to be used as an optical modulation element. There are some cases where the electro-optic element is destroyed.

In recorders such as laser printers, digital copying machines and the like, an optical modulation element array consisting of an electro-optic crystal is generally used. However, in recorders for recording an image on a heat-mode sensitive material, it is not normal practice to use an electro-optic element consisting of an electro-optic crystal.

Japanese Unexamined Patent Publication No. 4(1992)-49065 discloses an optical modulator employing an electro-optic crystal, in which the temperature of the electro-optic crystal is adjusted. In this publication it has been described that means for monitoring the temperature of an electro-optic element and heating the element is provided, in view of the problem that the operating characteristics of the element vary with ambient temperature and therefore the element cannot be used until the temperature within the optical modulator reaches a steady state. Also, Japanese Unexamined Patent Publication No. 4(1992)-161922 discloses an optical modulator employing a lead lanthanum zirconate titanate (PLZT) element as an electro-optic crystal. The optical modulator is provided with temperature detection means and heating means in order to avoid the hysteresis in an electric-field/transmitted-light-quantity operation which occurs near the PLZT element at room temperature, by heating up the PLZT element to the vicinity of a Curie point.

In the aforementioned conventional two techniques, however, no consideration has been given to the case where the respective optical modulators are employed during the recording of an image onto a heat-mode sensitive material. Therefore, when light recording is performed on a heat-mode sensitive material by an optical modulator with similar construction, there is a need to employ laser light having high power, as described above. As a result, a problem will arise in that the generation of heat in the electro-optic crystal will cause nonconformity in the element itself or light modulation.

On the other hand, Japanese Unexamined Patent Publication No. 4(1992)-175721 discloses an optical modulator in which an optical modulation element consisting of an electro-optic crystal is fixed to a base plate having nearly the same linear expansion coefficient as the linear expansion coefficient of the optical modulation element.

However, in the case where light recording is performed on a heat-mode sensitive material by an optical modulator constructed so that the linear expansion coefficient of an electro-optic crystal substrate is matched with that of a base plate, the degree of expansion of the electro-optic element becomes greater than that of the base plate (fixing member), because generally the temperature of the electro-optic element becomes higher than that of the base plate. Therefore, if the expansion coefficients of the base plate and the electro-optic crystal substrate are made equal to each other, a large amount of warping will occur in the electro-optic crystal element, and the warped element cannot be used as an optical modulation element because the electro-optic characteristics vary due to the warp. This warping results in the breakdown of the element in certain circumstances.

SUMMARY OF THE INVENTION

The present invention has been made in view of the aforementioned circumstances. Accordingly, it is an object of the present invention to provide an optical modulator that is capable of stably recording an image when it is recorded chiefly on a heat-mode sensitive material by an optical modulator equipped with an optical modulation element taking advantage of the secondary electro-optic effect of an electro-optic crystal.

To achieve this end, there is provided an optical modulator which comprises: an optical modulation element with an electro-optic crystal substrate, the electro-optic substrate having a plurality of apertures which are switched between a light transmitting state and a light cut-off state by control of drive voltage that is applied; drive means for applying the drive voltage across each aperture; temperature detection means for detecting a temperature of the electro-optic crystal substrate; cooling means for cooling the electro-optic crystal substrate; and control means for controlling the cooling means so that the temperature of the electro-optic crystal substrate does not exceed a predetermined temperature, based on information from the temperature detection means.

It is desirable that the control means control the cooling means so that the temperature of the electro-optic crystal substrate becomes constant.

Generally, the electro-optic crystal substrate constituting the optical modulation element is equipped with a common electrode and a plurality of individual electrodes corresponding to a plurality of apertures. The aforementioned "by control of drive voltage that is applied" means controlling voltage that is applied between the common electrode and the individual electrode which corresponds to each aperture.

The aforementioned "predetermined temperature" is a temperature at which there is no possibility that the electro-optic effect in the electro-optic crystal substrate will disappear, and is determined according to the material of the electro-optic crystal substrate.

In the aforementioned optical modulator, it is desirable that the cooling means be an element that takes advantage of thermoelectronic effect.

It is also desirable that a base plate be provided on the cooling means and that the optical modulation element be provided on the base plate.

It is preferable that the optical modulator satisfies $\kappa 2 \geq 50$ W/m·K and $\beta 2 > \beta 1$, in which $\beta 1$ is the linear expansion coefficient of the electro-optic crystal substrate, $\kappa 2$ is the thermal conductivity of the base plate, and $\beta 2$ is the linear expansion coefficient of the base plate. Furthermore, it is more desirable that the optical modulator satisfies $\kappa 2 \geq 100$ W/m·K and $\beta 2 > 3 \times \beta 1$.

In the aforementioned optical modulator, it is desirable that the electro-optic crystal substrate be a lead lanthanum zirconate titanate (PLZT) substrate and that the base plate consist of metal material.

Furthermore, it is desirable that the metal material be either any metal of Al, Cu, Au, Fe, Zn, Be, Cr, Ni, Co, Si, and C, or a material having an alloy of these as its main component.

The optical modulator of the present invention is equipped with temperature detection means for detecting a temperature of the electro-optic crystal substrate, cooling means for cooling the electro-optic crystal substrate, and control means for controlling the cooling means so that the temperature of the electro-optic crystal substrate does not exceed a predetermined temperature, based on information from the temperature detection means. Therefore, the optical modulator of the present invention can keep the electro-optic crystal substrate to less than a predetermined temperature. With this, in the case where the recording of an image is chiefly performed on a heat-mode sensitive material, i.e., in the case where there is a need to illuminate the electro-optic crystal substrate with light having high power, the optical modulator of the present invention prevents the problem that nonconformity arises in light modulation because of a temperature rise in the electro-optic crystal substrate, thereby rendering stable image recording possible.

The optical modulator of the present invention is also equipped with a base plate between the optical modulation element and the cooling means, the base plate having good thermal conductivity. The linear expansion coefficient of the base plate is made greater than that of the electro-optic crystal substrate. With this, the optical modulator of the present invention can prevent warping that will occur in the electro-optic crystal substrate because of the difference in amount of thermal expansion between the electro-optic crystal substrate and the base plate resulting from the thermal gradient difference therebetween. As a result, it becomes possible to perform stable recording of an image.

BRIEF DESCRIPTION OF THE DRWAINGS

The above and other objects and advantages will become apparent from the following detailed description when read in conjunction with the accompanying drawings wherein:

FIG. 1 is a perspective view of an optical modulator according to a first embodiment of the present invention;

DETAILED DESCRIPTION OF THE PREFERRED EMBODIMENTS

Figure 2:
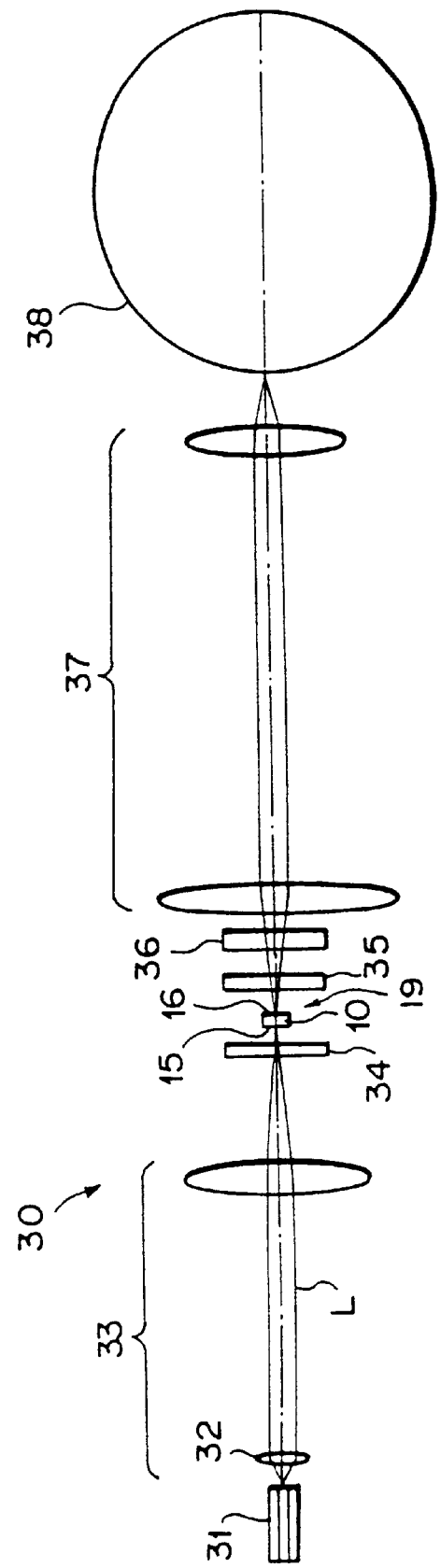
FIG. 2 is a side view of the optical system of a recorder equipped with the optical modulator of the present invention.

Referring to FIG. 1, there is shown an optical modulator 19 according to a first embodiment of the present invention.

As shown in the figure, the optical modulator 19 of the present invention is constructed of an optical modulation element 10. The optical modulation element 10 is equipped with an electro-optic crystal substrate 11, which consists of lead lanthanum zirconate titanate (PLZT) ceramic, a common electrode 12 formed on the under surface of the electro-optic crystal substrate 11, and a plurality of individual electrodes 13 formed on the top surface of the electro-optic crystal substrate 11. The optical modulator 19 of the present invention is further constructed of abase plate 18 (consisting of aluminum (Al)) on which the optical modulation element 10 is arranged, a thermistor (temperature detection means) 23 provided in a portion of the base plate 18 for detecting the temperature of the electro-optic crystal substrate 11, a temperature-adjusting assembly 20 for cooling the electro-optic crystal substrate 11, a drive circuit (not shown) to which the individual electrodes 13 of the optical modulation element 10 are connected, and control means (not shown) for performing the control of a temperature-adjusting assembly 20, based on temperature information from the thermistor 23. The temperature-adjusting assembly 20 is equipped with a thermoelectronic element (TE element) 21 and a radiating fin 22. The thermistor 23 is inserted into a thermistor insertion hole provided in a portion of the base plate 18.

The structure of the optical modulation element 10 of the present invention will hereinafter be described along with a fabrication method thereof.

PLZT ceramic $((La_xPb_{1-x})(Zr_yTi_{1-y})_{1-x/4}O_3)$ having a composition ratio of x/y/1−y=9/65/35 in the unit of % and also having an average grain size of 4 $\mu m\emptyset$ is employed as an electro-optic crystal. The base material of the element 10 is a wafer obtained by slicing PLZT ceramic at a thickness of 250 $\mu m$, and both sides of the wafer are slightly polished. This PLZT ceramic has a linear expansion coefficient of $\beta 1$=about $5\sim 6 \times 10^{-6}$/K and a thermal conductivity of $\kappa 1$=about 1 W/m·K.

First, a Cr-Au laminated film is formed as the common electrode 12 on one side of the above-mentioned wafer by vacuum deposition. At this time, let the thickness of the Cr film be 50 Å and the thickness of the Au film be 500 Å. Then, a group of individual electrodes are formed by a lift-off method on the other surface of the wafer opposite to the surface on which the common electrode 12 was formed. A photoresist is coated on the surface on which the individual electrodes 13 are formed. The photoresist is exposed with a photomask, which is provided with individual electrode patterns for forming individual electrodes and cutting mark patterns for cutting the wafer into individual elements. After exposure, development is carried out, whereby patterns are formed in the photoresist. Thereafter, as with the formation of the common electrode, a Cr-Au electrode is formed by vacuum deposition. Finally, the wafer is immersed in acetone to solve the photoresist patterns, and the thin film of Cr-Au deposited on the photoresist patterns is lifted off, whereby desired electrode patterns (a plurality of individual electrodes 13) are obtained.

For the geometric dimensions of the optical modulation element 10 in this embodiment, the aperture pitch is 100 $\mu m$, the individual electrodes are 80 $\mu m$ in width (x-direction) and 2 mm in length (z-direction=optical axis direction), and the interval between electrodes (x-direction) is 20 $\mu m$. The ratio of aperture pitch/PLZT plate thickness is 1/2.5.

Next, the wafer is cut into elements by a dicer. Each element has a width (x-direction) of 26 mm (=256 apertures) and a length (z-direction) of 2 mm.

The incident and exit end faces of each cut element are optically polished. Then, nonreflective coating is performed on both end faces against the wavelength of light that is actually employed. Here, the nonreflective coating employs a film of $SiO_2$, but may be constructed of other materials.

The surface of the processed element 10 on which the common electrode 12 was formed (the surface of the common electrode 12) is rigidly bonded to the base plate 18. The material of the base plate 18 is aluminum (Al), and the rigid bonding is performed with a conductive adhesive. Note that the rigid bonding may employ solder or the like instead of a conductive adhesive. The base plate 18 has a linear expansion coefficient of $\beta$=about $20\sim25\times10^{-6}$/K and a thermal conductivity of $\kappa$=about 200~250 W/m·K. The portion of this base plate 18 near the electro-optic crystal substrate 11 is provided with a hole into which the thermistor 23 for temperature detection is inserted. Note that the material of the base plate can employ either any metal of Al, Cu, Au, Fe, Zn, Be, Cr, Ni, Co, Si, and C, or material having an alloy of these as its main component.

The above-mentioned base plate 18 is rigidly bonded to the TE element 21. It is desirable that the maximum endothermic value of the TE element 21 be about twice the calorific value of the electro-optic crystal substrate 11. In the rigid bonding of the base plate 18 onto the TE element 21, a conductive adhesive was used. As with the above-mentioned case, solder or the like may be employed instead of a conductive adhesive. The TE element 21 is connected to a driver (not shown), which is control means for adjusting current to the TE element 21 so that the electro-optic crystal substrate 11 is adjusted to a constant temperature, based on the temperature information obtained by the thermistor 23.

Finally, the individual electrodes 13 are connected by wire bonding to bonding pads connected to the drive circuit (not shown).

The optical modulator 19, including the optical modulation element 10 fabricated in the above-mentioned manner, is employed in an optical system 30 such as that shown in FIG. 2. FIG. 2 shows the optical system of a recorder equipped with the above-mentioned optical modulator 19. Laser light L emitted from a laser light source 31 is formed into linear light by a lens group 33 including a cylindrical lens 32, the linear light being used for illuminating the whole of the optical modulation element 10. In this embodiment, an array of broad-area laser diodes (LDs) having a maximum rating of 80 W is employed.

In the case where the formed light is insufficient in a degree of polarization, the light is passed through a polarizer (not shown in FIG. 2). Then, the polarization direction of the light is rotated at an angle of 45° to the x-axis by a first half-wave plate 34 and is incident on the optical modulation element 10. The polarization plane of the light incident on the optical modulation element 10 is rotated by the double refraction occurring in the electro-optic medium in correspondence to voltage applied to the individual electrodes 13 of the optical modulation element 10. The rotated light is transmitted through the optical modulation element 10.

In this embodiment, a voltage of 80 V is applied between the electrodes (common electrode 12 and individual electrode 13) in the apertures through which light is transmitted.

The polarization plane of the light, transmitted through the optical modulation element 10, is turned by 45° again with a second half-wave plate 35. Note that the second half-wave plate 35 is not necessarily required. In a polarizer 36 arranged to form a cross-Nicol prism in cooperation with the aforementioned polarizer (not shown), the modulation of the angle of the polarization plane is converted to light intensity change. Thereafter, an image-forming lens system 37 reduces the aperture image to a predetermined size and forms the reduced image onto the photosensitive surface of a drum 38. In this embodiment the aperture pitch of the optical modulation element 10 is reduced from 100 $\mu$m to 30 $\mu$m.

The operation of the control means in the optical modulator 19 during the recording of an image is performed as follows.

Based on the optimum operating temperature of the optical modulation element 10 which has previously been obtained, the temperature of the electro-optic crystal substrate 11 is controlled so as to reach this optimum operating temperature. More particularly, the control means compares the optimum operating temperature with the temperature of the electro-optic crystal substrate 11 obtained based on temperature information from the thermistor 23 that indirectly detects the temperature of the electro-optic crystal substrate 11 equipped in a portion of the base plate 18. Based on the result of comparison, current to the TE element 21 (cooling means for the electro-optic crystal substrate 11) is adjusted so that both temperatures match each other.

Note that the control means is not limited to the above-mentioned case where the optical modulation element 10 is kept at the optimum operating temperature. For example, a predetermined temperature is set so that the temperature of the electro-optic crystal substrate 11 does not exceed a temperature at which the substrate 11 is able to keep its electro-optic characteristics. Then, the predetermined temperature is compared with the temperature of the electro-optic substrate 11 obtained from the thermistor 23. When the temperature of the substrate 11 exceeds the predetermined temperature, the TE element 21 may be controlled so as to perform cooling.

Thus, the optical modulator 19 of the present invention can adjust the temperature of the electro-optic crystal substrate 11 and suppress a temperature rise in the electro-optic crystal substrate 11. As a result, the electro-optic crystal can be used without being damaged.

The linear expansion coefficients $\beta1$ and $\beta2$ of the electro-optic crystal substrate 11 and the base plate 18 are in a relation of $\beta2>\beta1$ and meet a preferred relationship of $\beta2>3\times\beta1$. Therefore, this relationship can suppress warping that could occur by the relationship between the temperature difference, which is between the electro-optic crystal substrate 11 and the base plate, and each of the linear expansion coefficients because of a temperature rise in the electro-optic crystal substrate 11. As a result, this embodiment can prevent a degradation in the etinction ratio which is caused when warping occurs.

Figure 3:
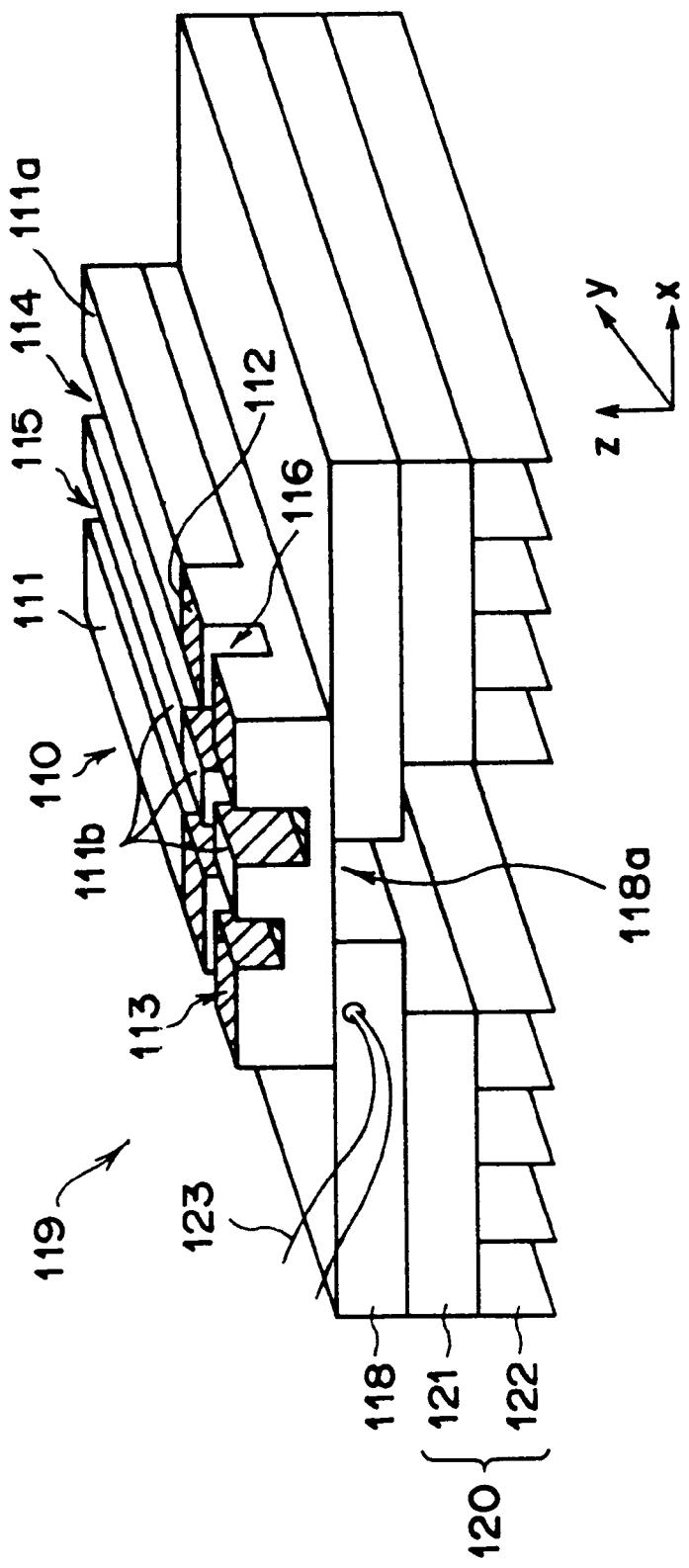
FIG. 3 is a perspective view of an optical modulator according to a second embodiment of the present invention.

FIG. 3 illustrates an optical modulator 119 constructed according to a second embodiment of the present invention. An optical modulation element 110 employed in the optical modulator 119 differs from the aforementioned optical modulation element 10 in that modulation is performed on light incident in a direction (z-direction in FIG. 3) perpendicular to a substrate surface.

The structure of this light modulation element 110 will hereinafter be described along with a fabrication method thereof.

A wafer, which is an electro-optic crystal substrate and constitutes the base material of the element 110, is the same as the aforementioned first embodiment. However, the plate thickness of the wafer is 0.5 mm. Also, since both sides of the wafer constitute surfaces through which light is transmitted, pre-optical polishing is performed to form a nonreflective coating against the wavelength of light that is actually employed. In this embodiment, the nonreflective coating employs a film of SiO2, but may be constructed of other materials.

A protective coating consisting of a resist polymer is applied to a surface 111b on the incident surface 111a of the wafer by lithography, the surface 111b becoming apertures.

Thereafter, in both sides of the surface 111b to which the protective coat was applied, grooves 114 and 115 are formed by a dicer in order to form drive electrodes 112 and 113 that constitute an aperture. The grooves 114 and 115 both have a width of 500 µm. One of the grooves 114 and 115 has a depth of 300 µm, while the other has a depth of 200 µm.

In the second embodiment, while the grooves 114 and 115 are formed only in the surface 111a of the wafer, they may be formed in both surfaces of the wafer. In addition, in the second embodiment, although a single aperture row is formed for a single optical modulation element, two or more rows can be formed.

Next, a film of Al is deposited on both grooves 114 and 115 across the aperture (surface 111b) at a thickness of 1000 Å by sputtering.

Furthermore, in order to form a plurality of apertures in the deposited Al film as individual electrodes (drive electrodes), grooves 116 are further formed so that they perpendicularly transverse the groove 114, the protective coat surface 111b, and the groove 115, previously formed by the dicer. The grooves 116 have a depth of 250 µm, a width of 50 µm, and a pitch of 50 µm.

Finally, the wafer is immersed in acetone to disolve the protective coat, and individual elements are cut from the wafer, whereby a final optical modulation element is obtained.

Next, the surface of the element 110 in which the grooves are not formed is rigidly bonded to a base plate 118. The material of the base plate 118 is aluminum and the rigid bonding is performed with a conductive adhesive. Note that in the rigid bonding, solder or the like may be employed instead of a conductive adhesive. In the base plate 118, a slit 118a with a size of 1 mm×26 mm is formed at a portion through which light is transmitted. Here, although the width of the slit 118a in the x-direction is 1 mm, it is preferable that the width be as small as possible in an optically allowable range. The portion of the base plate 118 near the electro-optic crystal substrate 111 is provided with a hole through which a thermistor 123 for temperature detection is inserted. Note that in the case where grooves are formed in both sides of the wafer to form rows of apertures, the wafer may be rigidly bonded with an insulating adhesive having better thermal conductivity, such as a silicon adhesive.

Furthermore, the above-mentioned base plate 118 is rigidly bonded to the TE element 121. It is desirable that the maximum endothermic value of the TE element 121 be about twice the calorific value of the electro-optic crystal substrate 110. A conductive adhesive is used for rigidly bonding the base plate 118 to the TE element 121. As with the above-mentioned case, solder or the like may be employed instead of a conductive adhesive. The TE element 121 is connected to a driver (not shown), which is control means for adjusting current to the TE element 121 so that the electro-optic crystal substrate 110 is adjusted to a constant temperature, based on the temperature information obtained by the thermistor 123.

Finally, the individual electrodes 13 and the common electrode 112 are connected by wire bonding to bonding pads connected to a drive circuit (not shown).

As with the first embodiment, the optimum operating temperature of the optical modulation element 110 has previously been obtained. When an image is recorded, the temperature of the electro-optic crystal substrate 111 is controlled so as to reach this optimum operating temperature. More particularly, the control means compares the optimum operating temperature with the temperature of the electro-optic crystal substrate 111 obtained based on temperature information from the thermistor 123 that indirectly detects the temperature of the electro-optic crystal substrate 111 equipped in a portion of the base plate 118. Based on the result of comparison, current to the TE element 121 (means for cooling the electro-optic crystal substrate 111) is adjusted so that both temperatures match each other.

Thus, the optical modulator 119 of the present invention can adjust the temperature of the electro-optic crystal substrate and suppress a temperature rise in the electro-optic crystal substrate. As a result, the electro-optic crystal can be used without being damaged.

Comparative examples of the optical modulator according to the aforementioned embodiment of the present invention will hereinafter be shown.

In the aforementioned second embodiment, a base plate consisting of SK5-glass was employed instead of the aluminum base plate. The SK5-glass base plate has a linear expansion coefficient of $\beta$=about $5.7 \times 10^{-6}$/K and a thermal conductivity of $\kappa$=about 1.1 W/m·K. In this case, since the SK-5 glass base plate is transparent, a slit for light transmission is not specially provided. When the optical modulator employing the SK5-glass base plate, as with the second embodiment, was used in the optical system shown in FIG. 2, the electro-optic crystal substrate was broken down shortly after the optical modulator was illuminated with light. It is conceivable that the breakdown of the substrate is due to a rise in the temperature of the substrate, because the thermal conductivity of the base plate is low and therefore the electro-optic crystal substrate cannot be sufficiently cooled.

In addition, an optical modulator employing aluminum as its base plate was constructed and a similar experiment was performed. The aluminum base plate has a linear expansion coefficient of $\beta$=about $5.5 \times 10^{-6}$/K and a thermal conductivity of $\kappa$=about 40 W/m·K. When the optical modulator employing the aluminum base plate was used in a similar optical system, the electro-optic crystal plate was not broken down. However, the light transmittance increased in a state in which no voltage is applied, and the extinction ratio was considerably degraded. It is conceivable that the extinction ratio degradation is due to a warping that occurs between the electro-optic crystal substrate and the base plate.

As also evident in the aforementioned comparative examples, the optical modulator of the present invention is provided with cooling means and control means for keeping the electro-optic crystal substrate at a constant temperature and is also equipped with the base plate having a thermal expansion coefficient in consideration of the thermal gradient between the electro-optic crystal substrate and the base plate, whereby the degradation or breakdown of the electro-optic crystal substrate can be prevented and stable image recording is rendered possible.

In the aforementioned embodiments, although it has been described that an image is recorded on a heat-mode sensitive material, the optical modulator of the present invention is not exclusively limited to the recording of an image onto the heat-mode sensitive material. Furthermore, while the present invention has been described with reference to the preferred embodiments thereof, the invention is not to be limited to the details given herein, but may be modified within the scope of the appended claims.

What is claimed is:

1. An optical modulator comprising:
   an optical modulation element with an electro-optic crystal substrate, the electro-optic substrate having a plurality of apertures which are switched between a light transmitting state and a light cut-off state by control of drive voltage that is applied;

drive means for applying said drive voltage across each said aperture;

temperature detection means for detecting a temperature of said electro-optic crystal substrate;

cooling means for cooling said electro-optic crystal substrate; and control means for controlling said cooling means so that the temperature of said electro-optic crystal substrate does not exceed a predetermined temperature, based on information from said temperature detection means.

2. The optical modulator as set forth in claim 1, wherein said control means controls said cooling means so that the temperature of said electro-optic crystal substrate becomes constant.

3. The optical modulator as set forth in claim 1 or 2, wherein said cooling means is an element that takes advantage of a thermoelectronic effect.

4. The optical modulator as set forth in claim 1 or 2, wherein a base plate is provided on said cooling means and said optical modulation element is provided on said base plate.

5. The optical modulator as set forth in claim 4, wherein $$\kappa 2 \geq 50 \text{ W/m·K and } \beta 2 > \beta 1$$

where $\beta 1$ is the linear expansion coefficient of said electro-optic crystal substrate, $\kappa 2$ is the thermal conductivity of said base plate, and $\beta 2$ is the linear expansion coefficient of said base plate.

6. The optical modulator as set forth in claim 5, wherein $$\kappa 2 \geq 100 \text{ W/m·K and } \beta 2 > 3 \times \beta 1.$$

7. The optical modulator as set forth in claim 6, wherein said electro-optic crystal substrate is a lead lanthanum zirconate titanate (PLZT) substrate and said plate consists of metal material.

8. The optical modulator as set forth in claim 7, wherein said metal material is either any metal of Al, Cu, Au, Fe, Zn, Be, Cr, Ni, Co, Si, and C, or material having an alloy of these as its main component.

* * * * *